(12) United States Patent
Belavy (10) Patent No.: US 12,159,303 B2
(45) Date of Patent: Dec. 3, 2024

(54) PROSPECTIVE OBJECT SEARCH TECHNIQUES BASED ON REMOVED OBJECTS

(71) Applicant: eBay Inc., San Jose, CA (US)

(72) Inventor: Stefan Robert-Francis Belavy, Portland, OR (US)

(73) Assignee: eBay Inc., San Jose, CA (US)

( * ) Notice: Subject to any disclaimer, the term of this patent is extended or adjusted under 35 U.S.C. 154(b) by 338 days.

(21) Appl. No.: 17/584,684

(22) Filed: Jan. 26, 2022

(65) Prior Publication Data

US 2023/0260000 A1    Aug. 17, 2023

(51) Int. Cl.
G06Q 30/00      (2023.01)
G06Q 30/0601    (2023.01)
G06T 7/194      (2017.01)
G06V 10/54      (2022.01)
G06V 10/56      (2022.01)

(52) U.S. Cl.
CPC ......... *G06Q 30/0627* (2013.01); *G06T 7/194* (2017.01); *G06V 10/54* (2022.01); *G06V 10/56* (2022.01); *G06T 2207/20224* (2013.01)

(58) Field of Classification Search
CPC .............................................. G06Q 30/06–08
See application file for complete search history.

(56) References Cited

U.S. PATENT DOCUMENTS

2019/0378204 A1* 12/2019 Ayush ................ G06Q 30/0643
2022/0327608 A1* 10/2022 Assouline ............ G06T 19/006

OTHER PUBLICATIONS

23151963, "European Search Report", EP Application No. 23151963, May 23, 2023, 2 pages.
Anonymous , "IKEA launches new AI-powered, digital experience—IKEA", retrieved from https://www.ikea.com/us/en/newsroom/corporate-news/ikea-launches-new-ai-powered-digital-experience-empowering-customers-to-create-lifelike-room-designs-pub58c94890 on Aug. 29, 2023, 4 pages.
23151963.8, "Foreign Office Action", EP Application 23151963.8, Jul. 31, 2024, 7 pages.
Anonymous, "Adobe Sensei: the power behind the AI in Adobe Creative Suite", Transmedia Training XP093186510, retrieved from << http:///www.transmedia.co.uk/article/adobe-sensei-the-power-behind-the-ai-in-the-adobe-creative-suite>>, Jul. 16, 2024, 7 pages.

* cited by examiner

*Primary Examiner* — Ethan D Civan
(74) *Attorney, Agent, or Firm* — FIG. 1 Patents (57) ABSTRACT

Search techniques are described that support locating and displaying prospective objects in digital images based on a removed object. A digital image, for instance, is received by a computing device as an input depicting a physical environment with various objects and displayed in a user interface. An object depicted by the digital image is removed. An aspect of the removed object is identified. A search system leverages the aspect to locate a prospective object. The prospective object is configured for display within the digital image. As a result, the digital image is displayed in the user interface as having the configured prospective object depicted in the physical environment.

19 Claims, 10 Drawing Sheets
(5 of 10 Drawing Sheet(s) Filed in Color)

PROSPECTIVE OBJECT SEARCH TECHNIQUES BASED ON REMOVED OBJECTS

BACKGROUND

Search systems maintain millions of listings for millions of physical objects available for purchase. Conventional search systems depend on an individual's ability to navigate the millions of listings for physical objects to find an object that will function in a physical environment of the individual. Additionally, the individual is tasked with mentally visualizing what each prospective object will look like in a physical environment where the individual intends to put the object. Oftentimes, the individual purchases a flawed object for the physical environment, realizing only upon receipt that the flawed object does not function as intended in the physical environment. Accordingly, conventional systems that rely on an individual's ability to find prospective objects and to mentally visualize what the prospective object will look like in the physical environment often result in undesired consequences to the search system, such as a decrease in user satisfaction, a decrease in user interaction with subsequent listings, and/or a cost of returning the object.

SUMMARY

Techniques and systems are described for locating prospective objects for display in a user interface. In an example, a computing device implements a search system to receive a digital image. The digital image depicts a physical environment that includes physical objects.

The digital image is displayed in a user interface and the search system processes the digital image to detect objects of the physical environment. An object depicted in the digital image is removed from the digital image, such as responsive to a user input selecting the object in the user interface. The search system locates a prospective object based on the removed object. For instance, the search system identifies an aspect of the removed object (e.g., color, pattern, texture) and leverages the aspect for filtering candidate objects to locate a prospective object, rather than relying on the individual's ability to search the candidate objects. The prospective object is configured for display within the digital image on the user interface, providing the individual with a realistic depiction of how the prospective object would look in the physical environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional search systems depend on an individual's ability to navigate millions of product listings to find a prospective object for a physical environment of the individual. For example, an individual looking to replace a current chair in their physical environment is tasked with manually searching through these listings to identify a prospective chair, e.g., using a keyword search. As such, conventional search systems rely on an ability of the individual to express an intended result via text which matches keywords associated with the prospective object. Additionally, these systems require the individual to mentally visualize what each prospective object will look like in a physical environment where the individual intends to place the object. Consequently, individuals often realize too late that a purchased object visually or spatially clashes with the current objects in the physical environment after receiving and positioning the clashing object, e.g., a texture of a purchased chair does not fit with the textures of the current objects. This often results in reduced user satisfaction and user interaction with subsequent listings, as well as inefficient use of computing and shipping resources. The clashing object is a result of the limited ability of conventional systems to accurately locate prospective objects that are a likely fit with current objects in a physical environment.

Accordingly, techniques are described that overcome these limitations to support determination and display of prospective objects within a digital image of a physical environment based on removed objects. Examples of objects include physical objects including chairs, plants, couches, desks, lamps, paintings, walls, and so on.

Consider an example in which a live camera feed a physical environment (e.g., a room in the individual's home that the user intends to redecorate) is captured from a camera device of a computing device. The live camera feed is processed into digital images, where each digital image depicts a perspective of the physical environment. A digital image of the room is displayed on a user interface of the computing device. The digital image is processed for object detection in the physical environment. In this example, the objects detected in the digital image include a plant, a planter, a chair, and a desk. For each object, a corresponding location within the digital image is determined. Additionally, aspects of the depicted objects are detected (e.g., using a classifier model as part of machine learning), such as each object's color, material, texture, structure, type, pattern, and so forth. Vector representations for each of the depicted objects are generated, such that the elements of a vector representation represent aspects of a corresponding object.

In this example, an individual selects an object of the depicted objects (e.g., the chair) for removal from the digital image on the user interface. As such, the chair is removed from the digital image at the chair's corresponding location. An aspect of the removed object is identified by the search system (e.g., the texture being matte) and utilized to locate prospective objects by filtering a set of candidate objects. Locating the prospective objects, for instance, is also based on learned style attributes of the individual, such as learned color preferences from past session history and/or favorited objects. In this way, the prospective objects are located to anticipate an individual's evolving sense of style. In this example, the set of candidate objects is selected by the search system from a database of listings of objects available for purchase, e.g., based on user data.

In some instances, the aspect of the removed object is identified based on a model trained by machine learning. In one instance, the model receives classification data of the depicted objects. In this example, the classification data is classified such that the remaining objects of the plant, the planter, and the desk depicted in the physical environment are in a first class (e.g., a positive sample) and the removed chair is in a second class, e.g., a negative sample. In this instance, the trained model identifies the aspect of the removed object based on the classification data from both the positive and negative samples.

In a first instance, the aspect is identified and used to filter out candidate objects. For example, the matte texture aspect of the chair is identified based on determining that none of the remaining objects of the digital image have a matte texture. As such, candidate objects that are determined to have the aspect are filtered out from the set of candidate objects.

In a second instance, the aspect is identified to filter candidate objects. For example, the matte texture of the chair is identified based on a determination that one or more of the remaining objects have a matte texture. As such, the set of candidate objects is filtered for candidate objects that are determined to have the desired aspect.

In some instances, the aspect is identified based on an association between the removed object and a remaining object. An association between the removed chair and the remaining desk, for instance, is determined based on a model trained by machine learning. Continuing with the previous example, the aspect of matte texture is identified to filter out candidate objects based on this association.

After the prospective object is located from the set of candidate objects, the prospective object is configured at a prospective location. Configuration of the prospective object is based on the location of the removed object, such as based on the vacancy at this location in the digital image, three-dimensional geometry at that location, objects, colors, and textures that surround the location, a detected plane of the digital image, and so forth, as well as based on the physical dimensions of the prospective object. In some instances, the prospective object is identified from a set of prospective objects based on user selection. When the search system determines user motion based on the live camera feed from the digital image to a subsequent digital image, the prospective object stays anchored to a fixed point in the depicted physical environment based on plane tracking.

In some instances, the prospective location is further based on a model trained by machine learning. The model is trainable to determine an aesthetic location for display of the prospective object based on aspects of the prospective object and the locations of the remaining objects. Example features of the aesthetic location include a relative size, a relative orientation, and a relative distance to the remaining objects depicted within the digital image. In this example, an aesthetic location of a prospective mirror is determined as centered between the plant and the desk, as well as a relative distance above the plant.

The digital image is displayed as having the configured prospective object in the user interface, e.g., as part of a live camera feed in an augmented reality scenario. For instance, the configuration of a prospective object is a three-dimensional model displayed in the user interface that automatically adjusts to motion of the live camera feed, such that an individual can walk around the physical environment and view the prospective object from multiple angles or perspectives without seeing the removed object. As such, the described systems are capable of accurately locating and displaying prospective objects. This is not possible using conventional systems that rely on an individual to search and mentally visualize prospective objects. Consequently, the described techniques improve operation of computing devices as part of search.

Furthermore, portions of the described systems are implementable to identify removed object aspects which is also not possible using conventional search systems. By removing objects and identifying aspects of the removed objects, the described systems are capable of locating relevant prospective objects and displaying the prospective objects in the digital image in a realistic manner. Thus, the described systems improve computer-based technology for both location and visualization of prospective objects.

Example Environment

Figure 1:
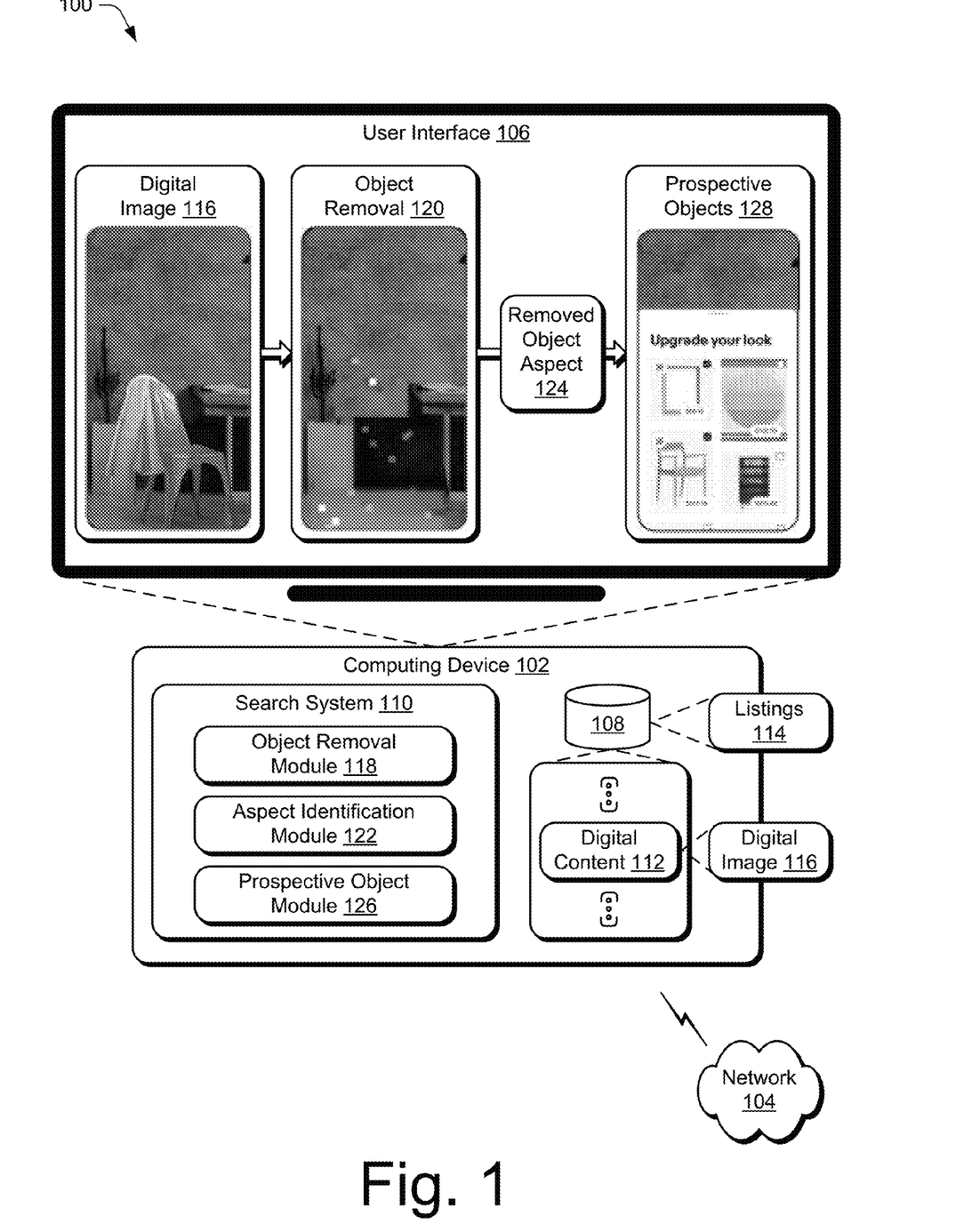
FIG. 1 is an illustration of an environment in an example implementation that is operable to employ digital systems and techniques for locating prospective objects for display in a user interface based on removed object aspects as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 ranges from a full resource device with substantial memory and processor resources (e.g., personal computers, game consoles) to a low-resource device with limited memory and/or processing resources, e.g., mobile devices. In some examples, the computing device 102 is representative of a plurality of different devices such as multiple servers utilized to perform operations "over the cloud" or as part of a digital service accessible via the network 104.

The illustrated environment 100 also includes a user interface 106 displayed by a display device that is communicatively coupled to the computing device 102 via a wired or a wireless connection. A variety of device configurations are usable to implement the computing device 102 and/or the display device. The computing device 102 includes a storage device 108 and a search system 110. The storage device 108 is illustrated to include digital content 112 such as digital photographs, digital images, digital videos, augmented reality content, virtual reality content, etc., as well as listings 114 that represent objects that are available for purchase via the search system 110.

The search system 110 is illustrated as having, receiving, and/or transmitting input data including digital content 112. In this example, the digital content 112 includes a digital image 116 that depicts a physical environment of objects, e.g., a physical environment of a room with a plant, a planter, a chair, and a desk. In some instances, the search system 110 receives and processes the digital content 112 to generate the digital image 116 which is rendered in a user interface 106. An object removal module 118 is configured by the search system 110 to remove an object depicted within the digital image at an object location. For instance, the object removal module 118 removes an object by determining modifications to the digital image 116 at the object location for display without the removed object. In some instances, the modifications are determined by detecting surrounding objects and generating image fill based on the surrounding objects. The object removal module 118 displays the digital image in the user interface 106 as depicted in object removal step 120.

An aspect identification module 122 is configured by the search system 110 to identify a removed object aspect 124 as described herein. In some instances, identification of the removed object aspect 124 is based on similarities and/or differences to the remaining objects. A prospective object module 126 is configured by the search system 110 to locate prospective objects 128. For instance, the prospective object module 126 locates prospective objects 128 by filtering listings of candidate objects 220 based on the removed object aspect 124.

Prospective Object Search Techniques Based on Removed Objects

Figure 2:
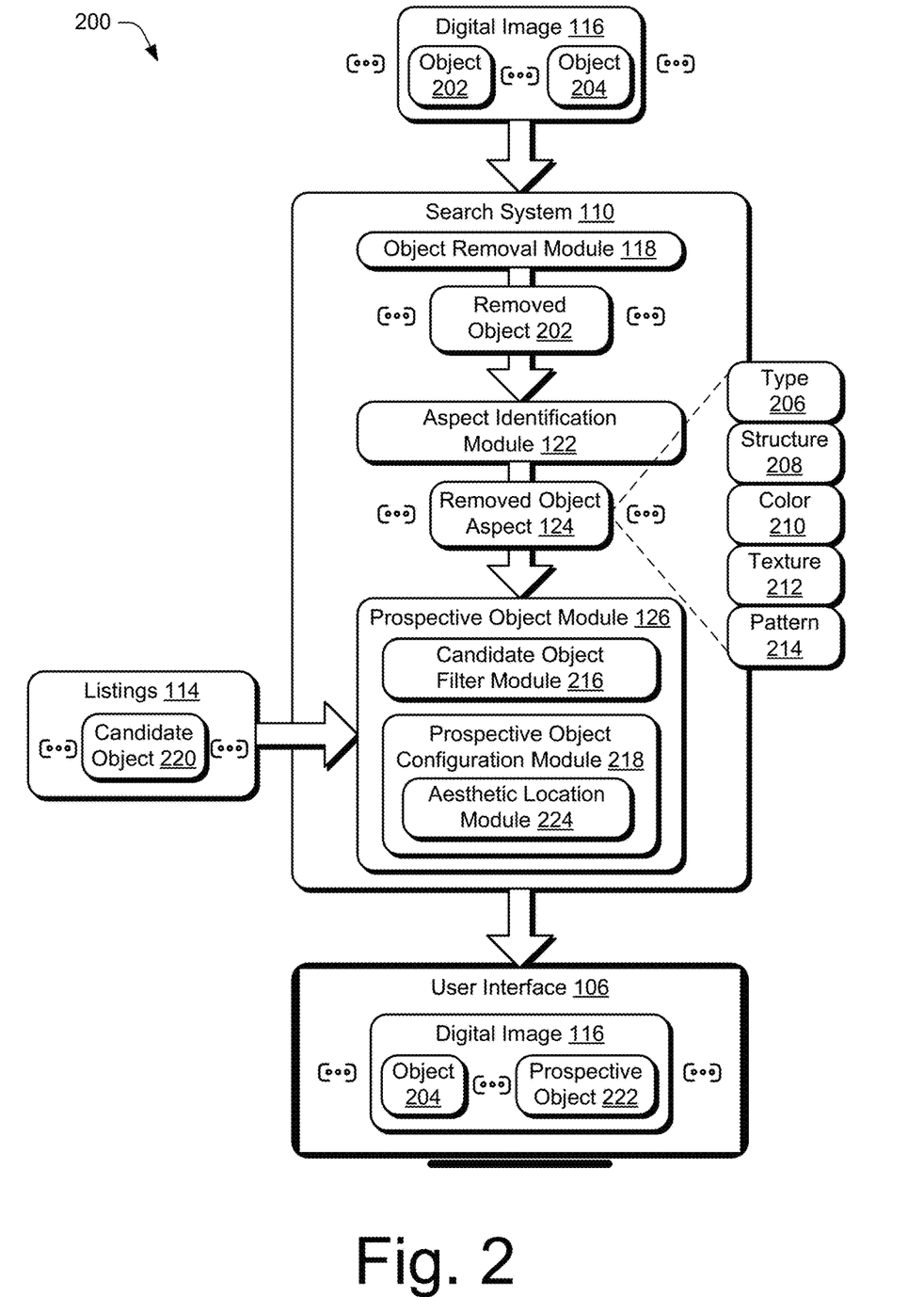
FIG. 2 depicts a system in an example implementation showing operation of a search system of FIG. 1 in greater detail.
Figure 3:
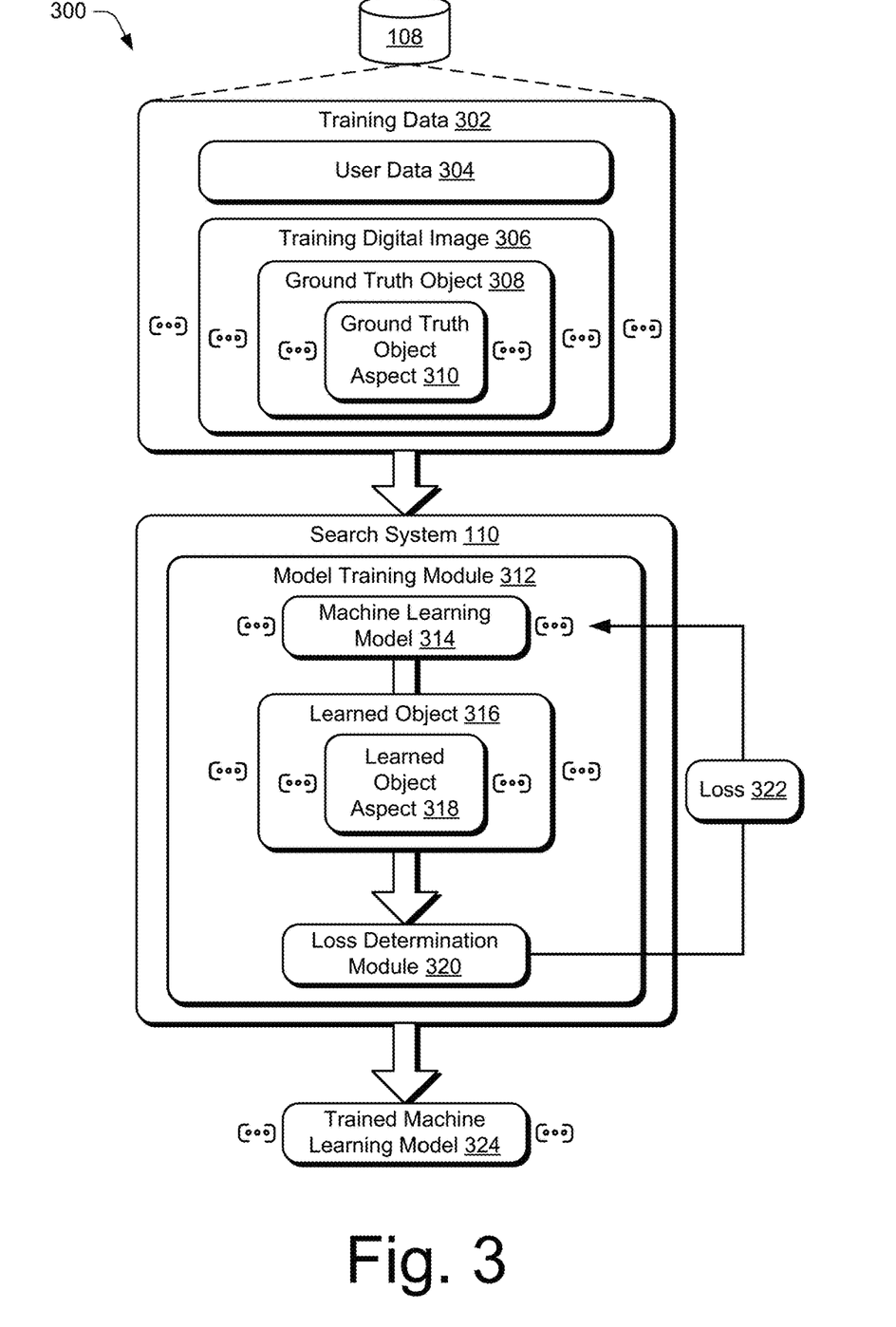
FIG. 3 depicts a system in an example implementation showing operation of training a machine learning model.
Figure 4:
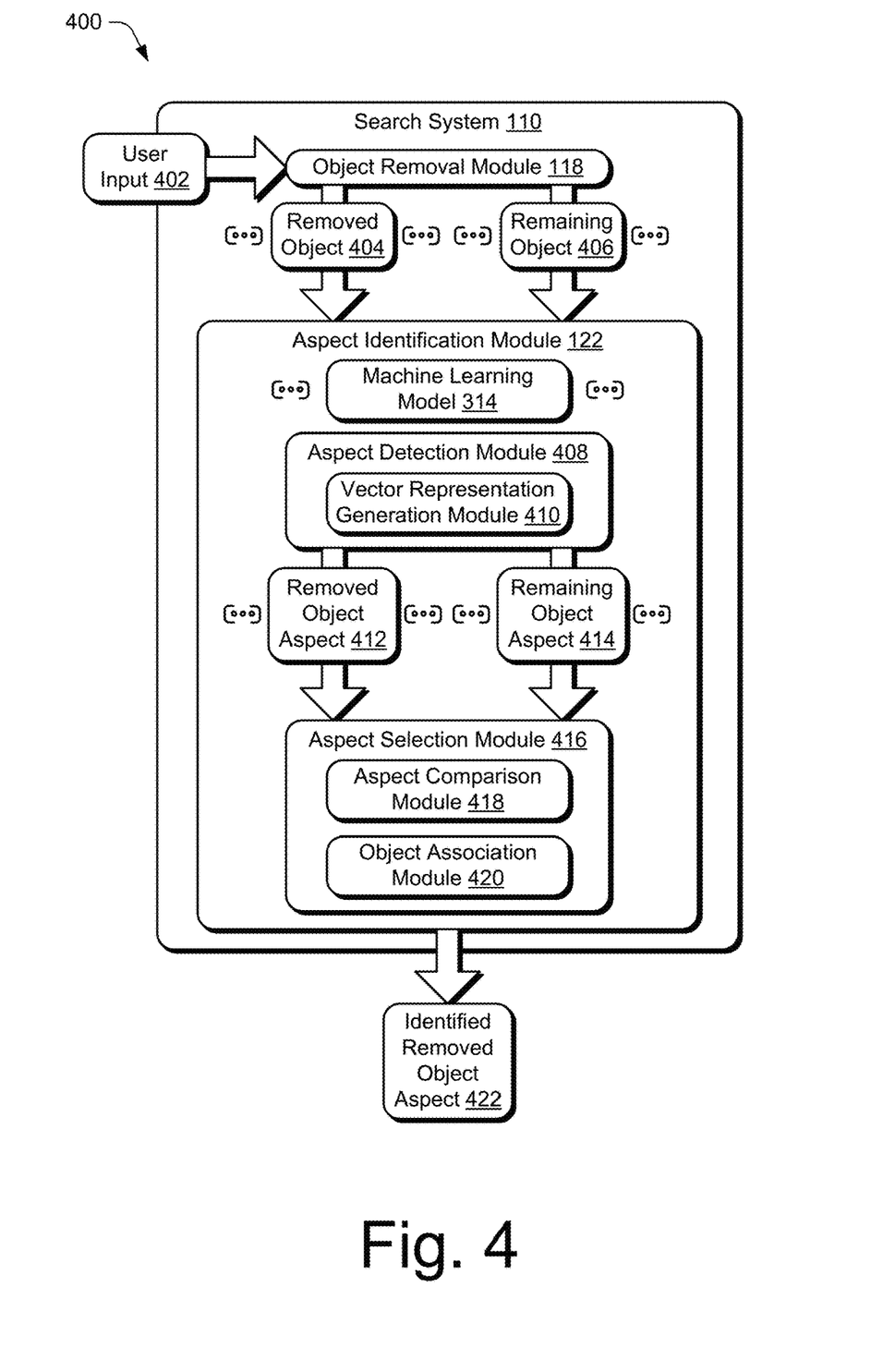
FIG. 4 depicts a system in an example implementation showing operation of identifying the removed object aspect by the search system of FIG. 1 in greater detail.
Figure 5:
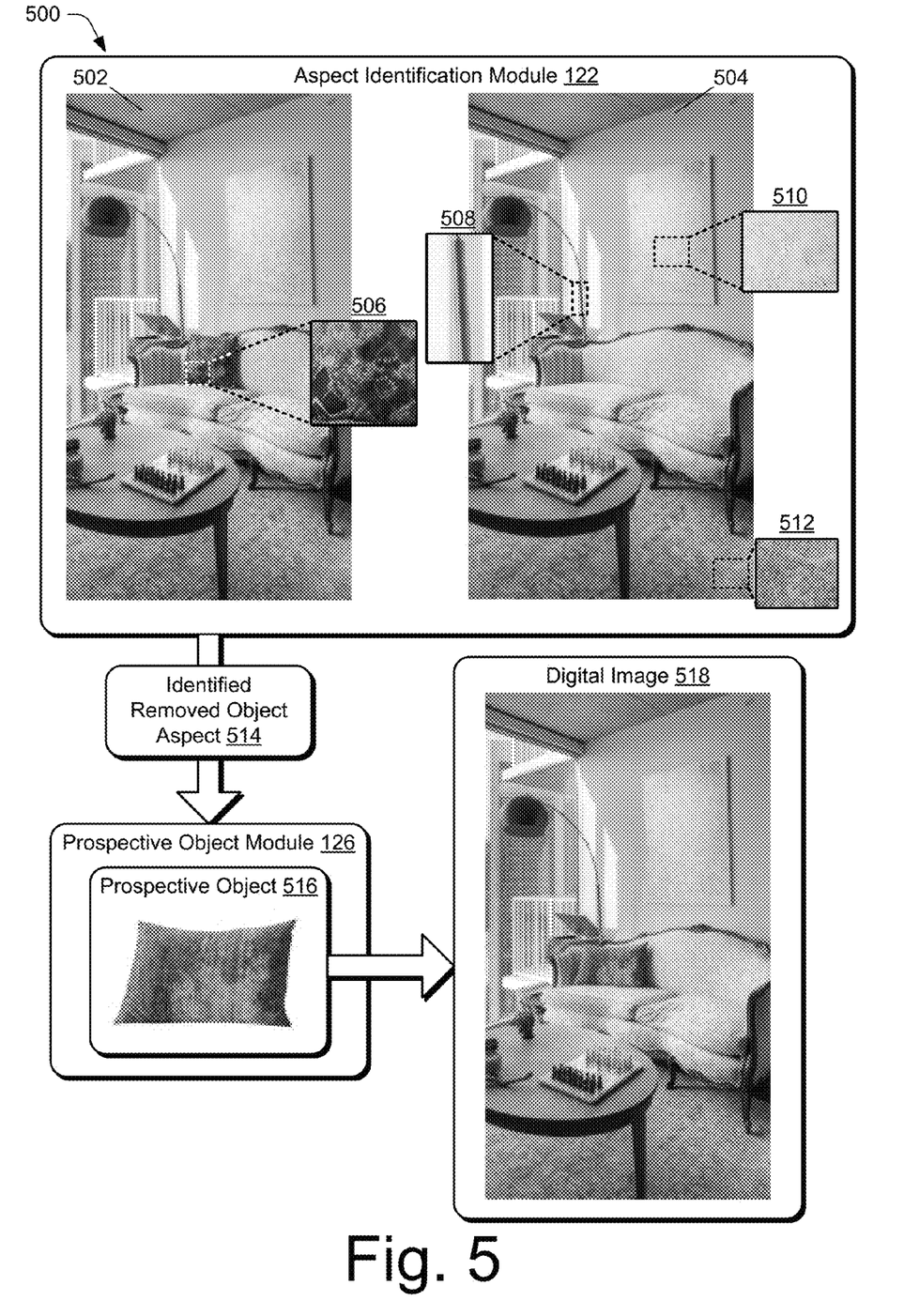
FIG. 5 illustrates a representation of locating a prospective object by filtering out candidate objects based on an identified removed object aspect.
Figure 6:
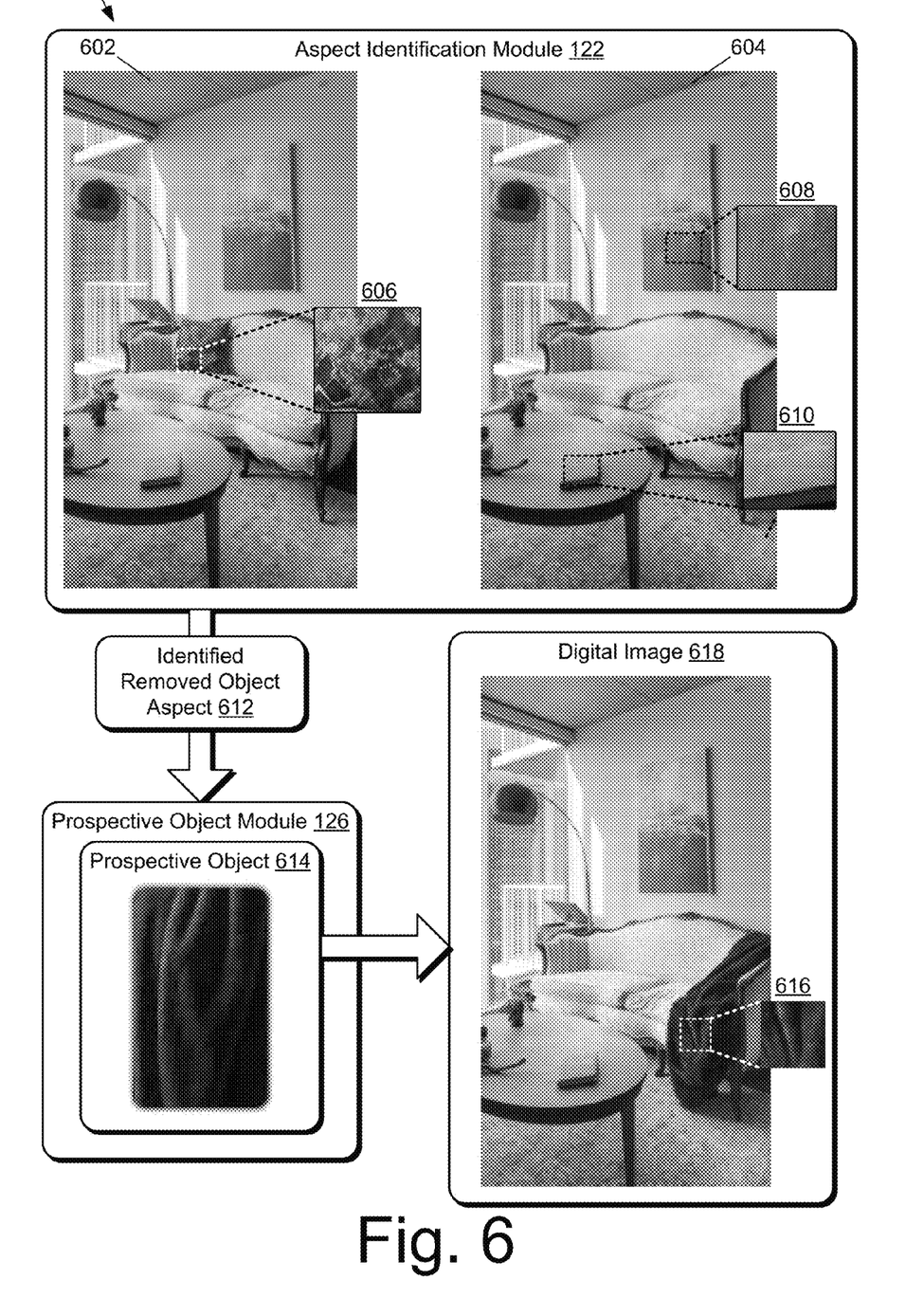
FIG. 6 illustrates a representation of locating a prospective object by filtering candidate objects for an identified removed object aspect.
Figure 7:
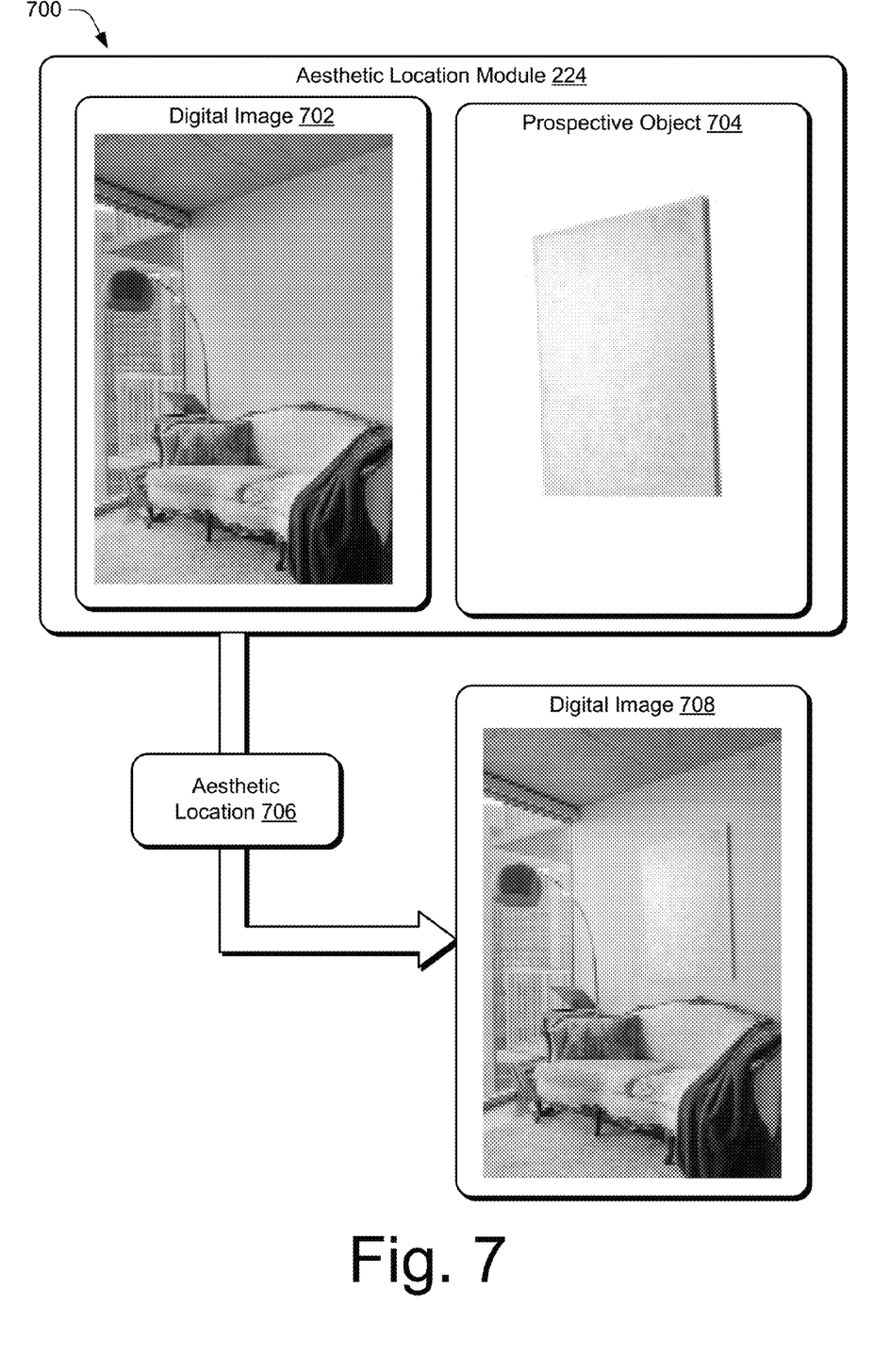
FIG. 7 illustrates a representation of determining an aesthetic location for a prospective object.
Figure 8:
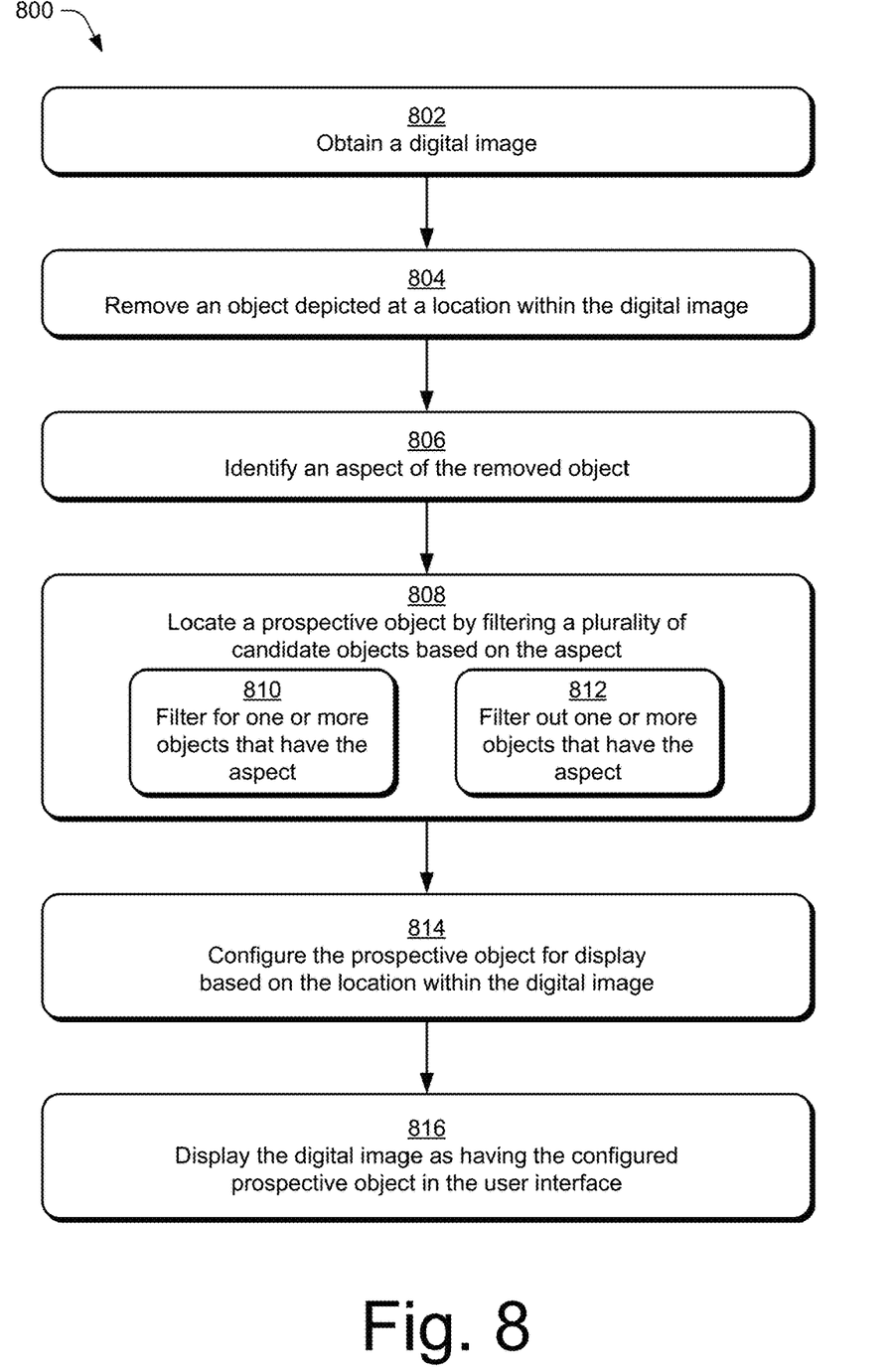
FIG. 8 is a flow diagram depicting a procedure in an example implementation in which a prospective object is displayed in a digital image.
Figure 9:
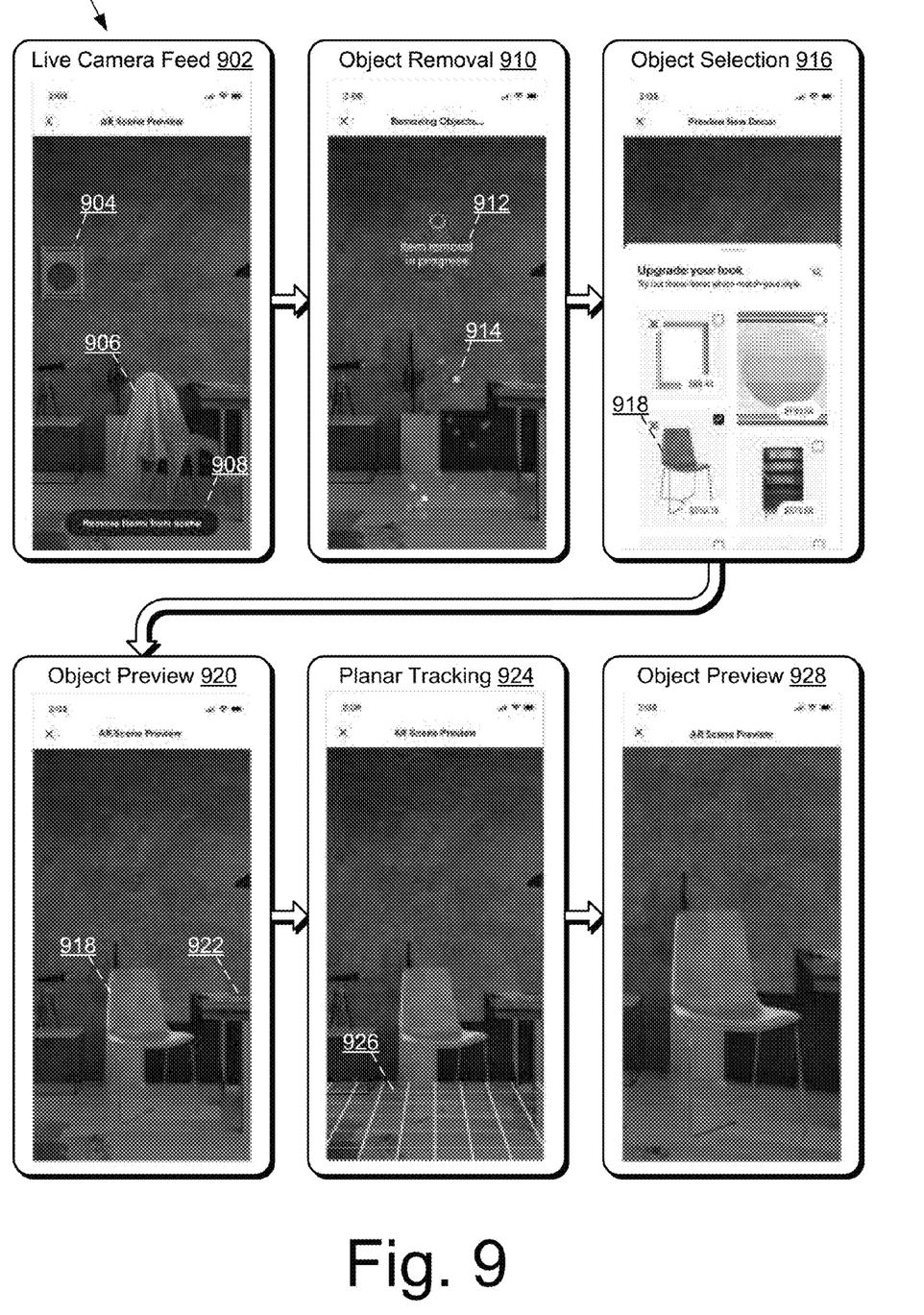
FIG. 9 is a flow diagram depicting a procedure 900 in an example implementation in which a prospective object is displayed in augmented reality.

FIG. 2 depicts a system 200 in an example implementation showing operation of a search system 110 of FIG. 1 in greater detail. FIG. 3 depicts a system 300 in an example implementation showing operations involved in training a machine learning model. FIG. 4 depicts a system 400 in an example implementation showing operation of identifying the removed object aspect by the search system 110 of FIG. 1 in greater detail. FIG. 5 illustrates an example 500 of locating a prospective object by filtering out candidate objects based on an identified removed object aspect. FIG. 6 illustrates a representation 600 of locating a prospective object by filtering candidate objects for an identified removed object aspect. FIG. 7 illustrates a representation 700 of determining an aesthetic location for a prospective object. FIG. 8 is a flow diagram depicting a procedure 800 in an example implementation in which a prospective object is displayed in a digital image. FIG. 9 is a flow diagram depicting a procedure 900 in an example implementation in which a prospective object is displayed in augmented reality.

The following discussion describes techniques that may be implemented utilizing the previously described systems and devices. Aspects of the procedure as shown stepwise may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-9. During the discussion, reference is also made in parallel to an example procedure 800 of FIG. 8.

As shown in an example system 200 of FIG. 2, the search system 110 obtains a digital image 116 that depicts an object 202 and an object 204 (block 802). The digital image 116 is displayed in user interface 106. The object removal module 118 removes the object 202 from the digital image 116 (block 804). The aspect identification module 122 then identifies a removed object aspect 124 (block 806). Examples of the removed object aspect 124 include type 206, structure 208, color 210, texture 212, pattern 214, and the like. The prospective object module 126 is illustrated to include a candidate object filter module 216 and prospective object configuration module 218.

The candidate object filter module 216 is configured to screen candidate objects 220, e.g., based on the removed object aspect 124. In some instances, the candidate object filter module 216 is configured to determine a set of candidate objects 220 from a set of available object listings 114 based on available data related to the individual, such as preferences, demographics, previous interactions, previous objects removed by the individual, etc., as well as available data similarly related to other users of the search system 110. A prospective object 222 is located by the candidate object filter module 216 by filtering candidate objects based on the removed object aspect (block 808). As further described in relation to FIG. 5, the candidate object filter module 216 filters out candidate objects that have the removed object aspect 124 (block 810), i.e., such that the candidate objects do not have the aspect. As further described in relation to FIG. 6, the candidate object filter module 216 filters for objects that have the removed object aspect 124 (block 812), i.e., such that the aspect is included in a search result.

The prospective object configuration module 218 configures the prospective object 222. In one instance, the prospective object 222 is configured by determining a relative scale measurement based on a detected distance within the digital image 116. The prospective object 222 is configured by identifying digital images of a respective listing of the prospective object, determining a two- or three-dimensional representation of the prospective object based on the digital images of the listing, and/or positioning the two- or three-dimensional representation of the prospective object for display.

The prospective object configuration module 218, for instance, generates augmented reality (AR) digital content for display via the user interface 106 as part of a "live feed" of digital images of the physical environment, e.g., the digital image 116. The AR digital content is a three-dimensional representation of the prospective object 222. In this way, the search system 110 supports functionality for the individual to "look around" the physical environment and view how a prospective object would appear from multiple angles of the physical environment before purchasing the prospective object.

A prospective location for the prospective object 222 is configured by an aesthetic location module 224 of the prospective object configuration module 218. The aesthetic location module 224 determines an aesthetic location for the prospective object 222, as described herein. The configured prospective object is displayed within the digital image 116 in the user interface at the prospective location.

FIG. 3 depicts a system 300 in an example implementation showing operations involved in training a machine learning model. To begin in this example, training data 302 describes user data 304 and training digital images 306. The user data 304 describes data related to the individual, as well as data of other users that have interacted with the search system 110, e.g., provided user input via a user interface. Examples of user data 304 include user content data (e.g., digital content including digital images of physical environments, previously purchased products), user characteristic data (e.g., demographic information such as age, gender, geographic location), user preference data (e.g., whether a previous prospective object resulted in conversion), and so forth. The training digital images 306 include various ground truth objects 308 and corresponding ground truth object aspects 310.

The training data 302 is received as an input by a model training module 312 to generate machine learning models 314. The model training module 312 is used to train a model 314 using machine learning techniques. Models trained using machine learning may include decision trees, support vector machines, linear regression, logistic regression, Bayesian networks, random forest learning, dimensionality reduction algorithms, boosting algorithms, artificial neural networks, deep learning, and so on. Thus, a model 314 trained using machine learning is configured to make high-level abstractions in data by generating data-driven predictions or decisions from the known input data.

The machine learning model 314 is configured to determine learned objects 316 and/or learned object aspects 318 of the learned objects 316 from the training digital image 306. In some instances, the learned objects 316 include learned configurations and/or learned locations corresponding to the learned objects 316.

The learned objects 316 and/or learned object aspects 318 are subsequently passed to a loss determination module 320 that implements a loss function to determine a loss 322 between the ground truth objects 308 and the learned objects 316 and/or the ground truth object aspects 310 and the learned object aspects 318. Responsive to determining the loss 322, the model training module 312 adjusts parameters of the machine learning model 314. This process is iteratively performed until the loss 322 is minimized. As a result, the model training module outputs a trained machine learning model 324 for utilization as described herein.

FIG. 4 depicts a system 400 in an example implementation showing operation of identifying the removed object aspect by the search system 110 of FIG. 1 in greater detail. To begin in example system 400, a digital image is obtained by the search system 110 and displayed on user interface 106. A user input 402 is received by the search system 110 on the user interface 106. The object removal module 118 removes an object depicted at a location within the digital image, e.g., a location that corresponds to the location of the user input 402 on the user interface 106. As illustrated in FIGS. 5 and 6, the object removal module 118, for instance, modifies a digital image 502 or 602 to generate a redacted digital image 504 or 604, respectively. A removed object 404 is removed from the digital image, such that at least one remaining object 406 is depicted within the digital image without the removed object 404.

In example 500, the removed object 404 is depicted as a pillow 506 in the digital image 502, and the remaining objects 406 include a lamp 508, a painting 510, and a rug 512. In some instances, one or more remaining objects are not considered in aspect identification, such as the coffee table depicted in the digital image 504.

Returning to FIG. 4, the removed object 404 and the remaining object 406 are received by the aspect identification module 122. In this example, the aspect identification module 122 includes at least one machine learning model 314, as described with respect to FIG. 3. An aspect detection module 408 is configured by the aspect identification module 122 to detect aspects of the removed object 404 and of the remaining object 406. In some instances, a vector representation generation module 410 of the aspect detection module 408 generates a vector representation for each object. In one instance, a vector representation is generated based on the machine learning model 314. In some instances, the vector representation is formatted by type of aspect, such as $V_{object}$=[type, color, pattern, texture, material, style].

In FIG. 5, the pillow 506 of digital image 502 has a vector representation of $V_{pillow}$=[pillow, maroon, embroidered, matte, cloth, bohemian]. In some instances, an element of the vector representation is determined to have multiple values for an aspect type, such as the color element for pillow 506 of the digital image 502 includes maroon, pink, blue, and yellow. Although described categorically, numerical values for any of the aspects are considered, e.g., color aspects are represented by red, green, and blue (RGB) decimal code.

In some instances, proportional values of an aspect for an aspect type are determined, such that each proportional value specifies a percent or an amount of the object that has that aspect of an aspect type (e.g., the painting 510 is 95% gold and 5% white, and/or the painting 510 is mainly gold with a white accent).

Continuing with FIG. 4, an aspect selection module 416 includes an aspect comparison module 418 and an object association module 420. The aspect selection module 416 is configured by the aspect identification module 122 to select an identified removed object aspect 422 of the removed object 404 for a prospective object search. The aspect comparison module 418 compares the removed object aspect 412 and the remaining object aspect 414, such as by a comparison of vector representations of the respective objects. In some instances, the aspect comparison module 418 determines a threshold value based on the remaining object aspect 414, e.g., which may be specified via a user control displayed in a user interface to specify different weights to be used.

In example 500, the maroon color of pillow 506 is determined to be different (e.g., based on a threshold value) to the gold color of the lamp 508, the gold color of the painting 510, and/or the yellow color of the rug 512. In this instance, the identified removed object aspect 514 is selected to be the maroon color of the pillow 506. In second instance, the selection of the identified removed object aspect 514 is based on multiple aspect types considered together, such as the maroon and pink colors and matte texture of the pillow 506 compared to the gold/yellow colors and shiny or satin texture of the remaining objects (508, 510, and 512). Any single, multiple, or learned combination of the removed object aspects can be selected as the identified removed object aspect 514, e.g., the maroon color, pink color, matte texture, or learned style aspect of the pillow 506.

In some instances, the aspect identification module 122 determines whether candidate objects that do or do not have the removed object aspect 514 will be filtered out. In FIG. 5, the identified removed object aspect 514 is designated to filter out candidate objects to locate prospective objects. As such, the prospective object module 126 determines a prospective object 516 (e.g., a cream-colored, shiny-textured pillow) based on the prospective object 516 not having the aspect, e.g., the prospective object 516 is not maroon colored.

On the other hand, in example 600 of FIG. 6, the removed object is depicted as a pillow 606, and remaining objects include a painting 608 and a book 610. In this example, the maroon color of the pillow 606 is selected as the identified removed object aspect 612 based on a determination that the maroon color is similar (e.g., within a threshold value) to the dark red color of the painting 608 and/or the red color of the book 610. In some instances, the identified removed object aspect 612 is designated to filter for candidate objects that have the identified removed object aspect 612 to locate prospective objects. As such, the prospective object module 126 determines a prospective object 614 (e.g., a dark red blanket) based on a determination that the prospective object 614 has the aspect, e.g., a detected dark red color aspect 616 of the prospective object 614 is within a threshold amount of the maroon color aspect 612 of the removed object, the pillow 606.

The object association module 420 determines one or more associations between objects depicted within the digital image. For example, in FIG. 6, a couch is depicted in the digital image 602 with the pillow 606 depicted on the couch. An association between the couch and the pillow 606 is determined to be an identified removed object aspect 612, such as based on a machine learning model 314 trained to determine semantic associations between objects. As such, the prospective object module 126 leverages the identified removed object aspect 612 to filter for candidate objects that are associated with couches, e.g., pillows, blankets, side tables, etc. In some instances, an association aspect is combined with other aspects to further refine the search for prospective objects. Where multiple objects are removed, an association between two or more removed objects is determined, e.g., both a pillow and a couch are removed. The prospective object module 126 may leverage the removed object association to filter for/out candidate objects that are associated with couches or pillows.

Returning to FIG. 5, after locating a prospective object 516, e.g., the prospective pillow, the prospective object is configured for display. In one instance, this configuration is based on the location of the removed object (block 814), e.g., as a reference point for augmentation of the prospective object into digital image 504 to generate a digital image 518. As such, the digital image 518 is displayed as having the configured prospective object in the user interface 106 (block 816). The prospective object 614 is similarly augmented into the digital image 604 to generate a digital image 618.

In FIG. 7, a digital image 702 and a prospective object 704 (e.g., a gold painting) are received by the aesthetic location module 224. Based on the digital image 702, the aesthetic location module 224 determines an aesthetic location 706 for configuration of display of the prospective object 704. For example, the aesthetic location 706 for the prospective object 704 is determined to be centered and above the couch based on a model trained by machine learning. In some instances, the model is trained by training images of aesthetically located paintings and other such art pieces similarly. A digital image 708 is generated with the prospective object 704.

In FIG. 9, a live camera feed 902 of a camera device of the computing device 102 is captured. The user interface 106 displays the live camera feed 902. For example, the live camera feed 902 depicts a physical environment (e.g., a room for redecoration of the user) with various objects depicted in the room. In this example 900, two objects (e.g., an art piece 904 and a pink chair 906) are selected for removal by the user, and a user input (e.g., selection of a removal button 908) is received that initiates object removal 910.

The two objects (the art piece 904 and the pink chair 906) depicted in the live camera feed are removed from the user interface 106 as depicted in object removal 910. For example, the object removal module 118 samples surrounding image data to generate a background fill to appear as if an object has been removed, e.g., via an artificial intelligence cloning process. The background fill, for instance, is a three-dimensional object in the user interface 106, e.g., responsive to the user moving the camera device in the physical environment, the background fill adjusts automatically based on new surrounding image data. In some instances, the user is notified that the two objects, the art piece 904 and the pink chair 906, are being removed, e.g., via a display message 912, via visual cue 914, and so forth.

In some instances, a predictive algorithm (e.g., model 314) is leveraged by the prospective object module 126 to determine learned style attributes based on user data, including past session history and favorited objects. The prospective objects are located from an inventory of candidate objects based on the learned style attributes. A variety of prospective objects are displayed in the user interface 106 after the object removal 910. For example, the prospective objects are items of new home décor from inventory of the search system 110.

In object selection 916, a prospective object 918 (e.g., a brown chair) is selected by the user on the user interface 106 for augmented reality object preview 920. Upon selection, the prospective object 918 is inserted into the scene. In some instances, the prospective object 918 is configured for proportional placement in relation to at least one remaining object 922. In one instance, the prospective object 918 is proportionally placed based on metadata attributes of the prospective object, such as physical dimensions, object aspects as described herein, etc. The prospective object 918, for instance, is configured as a three-dimensional model, e.g., responsive to the user moving the camera device in the physical environment, the three-dimensional model of the prospective object 918 adjusts the display of the three-dimensional model automatically, such as via rotation and scaling.

This adjustment of the three-dimensional model of the prospective object 918, for instance, depends on planar tracking 924. The prospective object 918 is configured to be anchored to a plane 926 of the augmented reality object preview 920. In some instances, planar motion tracking is automatically activated and the 3D model of the object is anchored to the plane of the scene. Planar tracking enables the user to walk around the room and view the 3D object within the scene at multiple angles or perspectives, e.g., object preview 928.

Example System and Device

Figure 10:
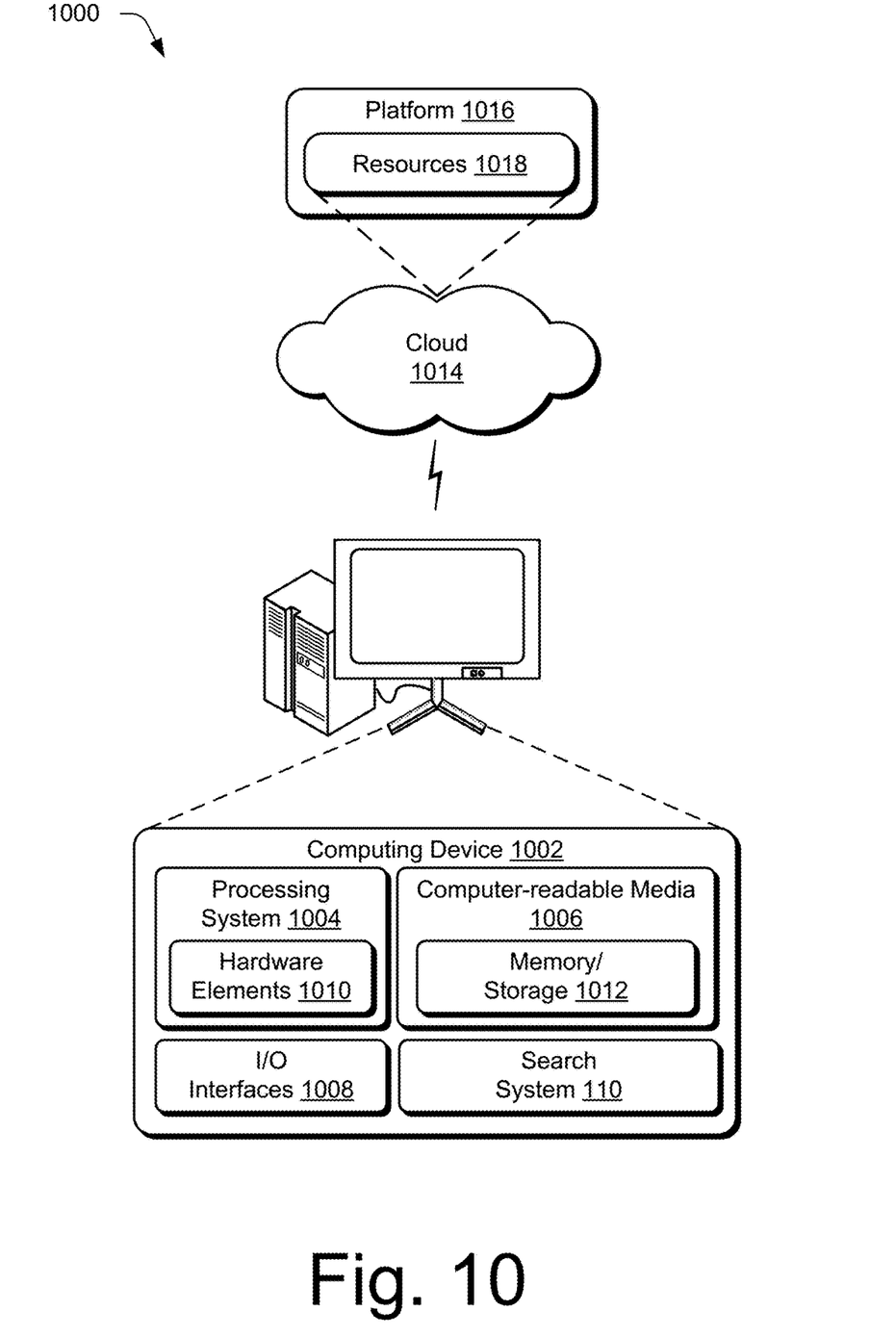
FIG. 10 illustrates an example system including various components of an example device that can be implemented as any type of computing device as described and/or utilize with reference to FIGS. 1-9 to implement embodiments of the techniques described herein.

FIG. 10 illustrates an example system 1000 that includes an example computing device that is representative of one or more computing systems and/or devices that are usable to implement the various techniques described herein. This is illustrated through inclusion of the search system 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Conclusion

Although implementations of systems locating prospective objects based on removed objects have been described in language specific to structural features and/or methods, it is to be understood that the appended claims are not necessarily limited to the specific features or methods described. Rather, the specific features and methods are disclosed as example implementations of systems for locating prospective objects based on removed objects, and other equivalent features and methods are intended to be within the scope of the appended claims. Further, various different examples are described, and it is to be appreciated that each described example is implementable independently or in connection with one or more other described examples.

What is claimed is:

1. A method comprising:
    obtaining, by a computing device, a digital image depicting a physical environment;
    displaying, by the computing device, the digital image in a user interface;
    removing, by the computing device, an object depicted at a location within the digital image;
    identifying, by the computing device, an aspect of the removed object;
    locating, by the computing device, a prospective object without the aspect by filtering out a plurality of candidate objects that have the aspect;
    configuring, by the computing device, the prospective object for display based on the location within the digital image; and
    displaying, by the computing device, the digital image as having the configured prospective object in the user interface.

2. The method as described in claim 1, wherein the identifying the aspect of the removed object is based on a model trained by machine learning.

3. The method as described in claim 2, wherein the identifying the aspect of the removed object is further based on data generated from one or more objects depicted within the digital image, the removed object being a negative sample and one or more remaining objects depicted within the digital image being one or more positive samples.

4. The method as described in claim 1, wherein the identifying the aspect of the removed object is based on at least part of a generated vector representation of the removed object.

5. The method as described in claim 1, further comprising determining the plurality of candidate objects from a database of listings of objects available for purchase.

6. The method as described in claim 1, wherein the removing the object is responsive to receiving user input indicating removal of the object.

7. The method as described in claim 1, wherein the identifying the aspect of the removed object is based on determining that one or more remaining objects depicted within the digital image do not have the aspect of the removed object.

8. The method as described in claim 1, wherein the aspect is an object type.

9. The method as described in claim 1, wherein the aspect is based at least in part on a color, texture, or pattern of the removed object.

10. A computing device comprising:
    a processing system; and
    a computer-readable storage medium having instructions stored thereon that, responsive to execution by the processing system, causes the processing system to perform operations including:
        displaying a digital image in a user interface;
        removing an object depicted at a location within the digital image;
        identifying an aspect of the removed object;
        locating a prospective object without the aspect by filtering out a plurality of candidate objects that have the aspect;
        configuring the prospective object for display based on the location within the digital image; and
        displaying the digital image as having the configured prospective object in the user interface.

11. The computing device as described in claim 10, wherein the identifying the aspect of the removed object is based on a model trained by machine learning.

12. The computing device as described in claim 11, wherein the identifying the aspect of the removed object includes generating a vector representation of the removed object from the model trained by machine learning, the vector representation indicative of the aspect of the removed object.

13. The computing device as described in claim 10, wherein the filtering out the plurality of candidate objects that have the aspect is based on determining that one or more remaining objects depicted within the digital image have the aspect of the removed object.

14. The computing device as described in claim 11, wherein the filtering out the plurality of candidate objects that have the aspect is based on an association between the removed object and a remaining object of one or more remaining objects depicted within the digital image learned by the model trained by machine learning.

15. The computing device as described in claim 10, wherein the digital image is part of a live camera feed of a physical environment.

16. One or more computer-readable storage media comprising instructions stored thereon that, responsive to execution by one or more processors, causes the one or more processors to perform operations comprising:

displaying a digital image in a user interface;

removing an object depicted at a location within the digital image;

identifying an aspect of the removed object;

locating a prospective object without the aspect by filtering out a plurality of candidate objects that have the aspect;

configuring the prospective object for display based on the location within the digital image; and displaying the digital image as having the configured prospective object in the user interface.

17. The one or more computer-readable storage media as described in claim 16, wherein the filtering out the plurality of candidate objects that have the aspect includes filtering the plurality of candidate objects for one or more objects that have the aspect.

18. The one or more computer-readable storage media as described in claim 16, wherein the configuring the prospective object for display includes learning an aesthetic location for the display of the prospective object within the digital image based on a model trained by machine learning.

19. The one or more computer-readable storage media as described in claim 18, wherein the aesthetic location includes at least one of a relative size, a relative orientation, and a relative distance to one or more remaining objects depicted within the digital image.

* * * * *